United States Patent
Harel

(10) Patent No.: US 8,305,953 B2
(45) Date of Patent: Nov. 6, 2012

(54) NARROWBAND TRANSMISSIONS USING A PLURALITY OF ANTENNAS

(75) Inventor: Tom Harel, Shfaim (IL)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 12/415,970

(22) Filed: Mar. 31, 2009

(65) Prior Publication Data

US 2010/0246558 A1 Sep. 30, 2010

(51) Int. Cl.
*H04B 7/204* (2006.01)
*H04B 7/208* (2006.01)
*H04J 1/00* (2006.01)

(52) U.S. Cl. ......... 370/319; 370/343; 370/344; 370/480

(58) Field of Classification Search .................. None
See application file for complete search history.

(56) References Cited

U.S. PATENT DOCUMENTS

| 2006/0176859 | A1* | 8/2006 | Lee et al. ...................... 370/335 |
| 2007/0004465 | A1* | 1/2007 | Papasakellariou et al. ... 455/571 |
| 2007/0258540 | A1* | 11/2007 | Ratasuk et al. ............... 375/267 |
| 2009/0067534 | A1* | 3/2009 | Kwak et al. ................... 375/267 |
| 2009/0196328 | A1 | 8/2009 | Kravtsov et al. |
| 2009/0310696 | A1* | 12/2009 | Yang ............................ 375/267 |
| 2010/0197241 | A1* | 8/2010 | Aedudodla et al. ........ 455/67.13 |

OTHER PUBLICATIONS

U.S. Appl. No. 12/025,389; "Method and Apparatus Adapted for Localized Hopping OFDMA and Power Efficient OFDMA Multiplexing," Feb. 4, 2008, 18 pages, USA.
Stewart, et al., "An Analysis of the Benefits of Uplink MIMO in Mobile WiMAX Systems," SEQUANS Communications PMC-SIERRA, Jun. 2008, pp. 1-19.

* cited by examiner

*Primary Examiner* — Jianye Wu
*Assistant Examiner* — Christine Duong
(74) *Attorney, Agent, or Firm* — Schwabe, Williamson & Wyatt, P.C.

(57) ABSTRACT

Embodiments of the present disclosure describe orthogonal frequency division multiple access (OFDMA) transmissions using a plurality of antennas and/or transmit chains. Still other embodiments may be described and claimed.

19 Claims, 4 Drawing Sheets

US 8,305,953 B2

NARROWBAND TRANSMISSIONS USING A PLURALITY OF ANTENNAS

FIELD

Embodiments of the present disclosure relate to the field of wireless access networks, and more particularly, to narrowband transmissions using a plurality of antennas.

BACKGROUND

Orthogonal frequency division multiple access (OFDMA) communications use an orthogonal frequency-division multiplexing (OFDM) digital modulation scheme to deliver information across broadband networks. OFDMA is particularly suitable for delivering information across wireless networks.

OFDMA-based communication systems are well known to have high peak-to-average power (PAPR) ratios. A high PAPR may reduce transmitter power amplifier (PA) power efficiency by increasing PA back off in order to comply with constraints imposed by regulatory spectral masks limit emissions outside of a designated frequency band.

Communication devices that operate under these transmission power constraints often employ multiple antennas to increase spatial diversity to improve the quality and reliability of a wireless link. For example, a communication device may employ a cyclic delay diversity (CDD) scheme that transmits a signal over a number of antennas with each transmitted signal being provided with a different degree of cyclic delay.

In another example, communication devices using distributed OFDMA allocations, e.g., uplink—partially used subchannel (UL-PUSC) schemes, may transmit different portions of a signal over different antennas. To provide CDD in these schemes, consecutive portions of the signal are interleaved over the different antennas.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means (A), (B), or (A and B). For the purposes of the present invention, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure provide apparatuses and methods for narrowband OFDMA transmissions using a plurality of antennas/transmit chains. The method may work by dividing a frequency band into contiguous frequency partitions and transmitting physical resource units within each of the partitions over an antenna/transmit chain uniquely designated for transmissions in the respective partition.

These methods and systems may be applied to OFDMA communications as presented in, e.g., the Institute of Electrical and Electronics Engineers (IEEE) 802.16-2004 standard along with any amendments, updates, and/or revisions, $3^{rd}$ Generation Partnership Project (3GPP) long-term evolution (LTE) project, ultra mobile broadband (UMB) project, etc.

Figure 1:
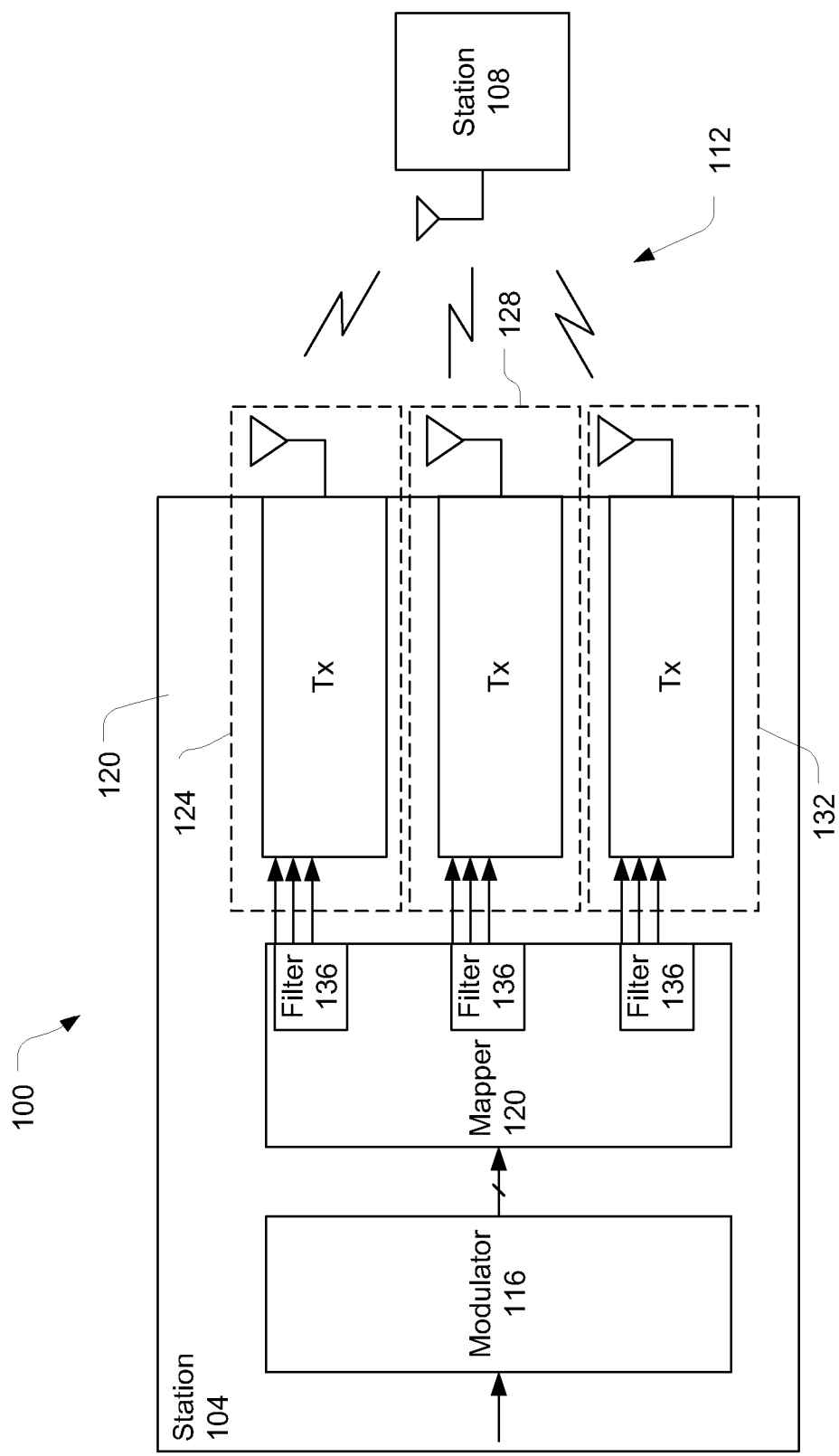
FIG. 1 illustrates an OFDMA wireless neighborhood in accordance with some embodiments.

FIG. 1 illustrates a wireless communication environment 100 in accordance with an embodiment of this disclosure. In this embodiment, the wireless communication environment 100 is shown with two wireless communication devices, e.g., station 104 and station 108, communicatively coupled to one another via an over-the-air (OTA) communication link 112.

In some embodiments, the station 104 may be a mobile/fixed station while the station 108 may be a base station that provides the station 104 access to a wider network. In these embodiments, a transmission from the station 104 to the station 108 may be referred to as an uplink transmission. In other embodiments, the station 104 may be the base station and the station 108 may be the mobile/fixed station and the transmission from the station 104 to the station 108 may be referred to as a downlink transmission.

The station 104 may include a modulator 116 to receive an input data stream from upper layers of the station 104. The modulator 116 may generate a wideband transmission that represents the input data stream. The wideband transmission may be one or more OFDMA symbols distributed across a number of logical resource units.

The wideband transmission may be provided to the mapper 120. The mapper 120 may generate a plurality of narrowband transmissions that collectively make up the wideband transmission. In some embodiments, the mapper 120 may generate the plurality of narrowband transmissions by mapping logical resource units to physical resource units. A physical resource unit, as used herein, may be a unit of a resource used for transmitting communications over a communication link. In some embodiments, a physical resource unit may include a first number of contiguous subcarriers over a second number of OFDM symbols. For example, in embodiments in which the transmission is an UL-PUSC transmission, the resource unit may be a tile that includes, e.g., four contiguous subcarriers over three OFDMA symbols.

The mapper 120 may provide each narrowband transmission to a respective transmit chain. In this embodiment, three transmit chains are shown: transmit chain 124, transmit chain 128, and transmit chain 132. Each of the transmit chains may include a transmitter coupled to an antenna. The transmitters may include a variety of elements to facilitate processing and transmission of the physical resource units. These elements may include, but are not limited to, inverse fast Fourier transformers (IFFTs), filters, radio frequency power amplifiers, etc. While three transmit chains are shown in station 104, other embodiments may have a different number.

In some embodiments, the mapper 120 may provide the narrowband transmissions to the transmit chains as an ordered mapping of the physical resource units based on frequency partitions within which the physical resource units reside. For example, in the embodiment with three transmit chains, a frequency band may be divided into three frequency partitions with each frequency partition having a one-to-one correspondence with one of the transmit chains.

Each frequency partition may be a range of contiguous frequencies that is assigned to a respective transmit chain. Therefore, each transmit chain will be dedicated to transmitting physical resource units within a designated frequency partition. While the frequency partitions may be equally sized in many embodiments, they may have different sizes in other embodiments.

In various embodiments, the mapper 120 may use one or more filters 136 to provide a narrowband transmission of desired frequencies to its respective transmit chain. In these embodiments, a filter may be provided for each transmit chain to filter out frequencies outside of a range of frequencies that is assigned to a particular transmit chain.

Figure 2:
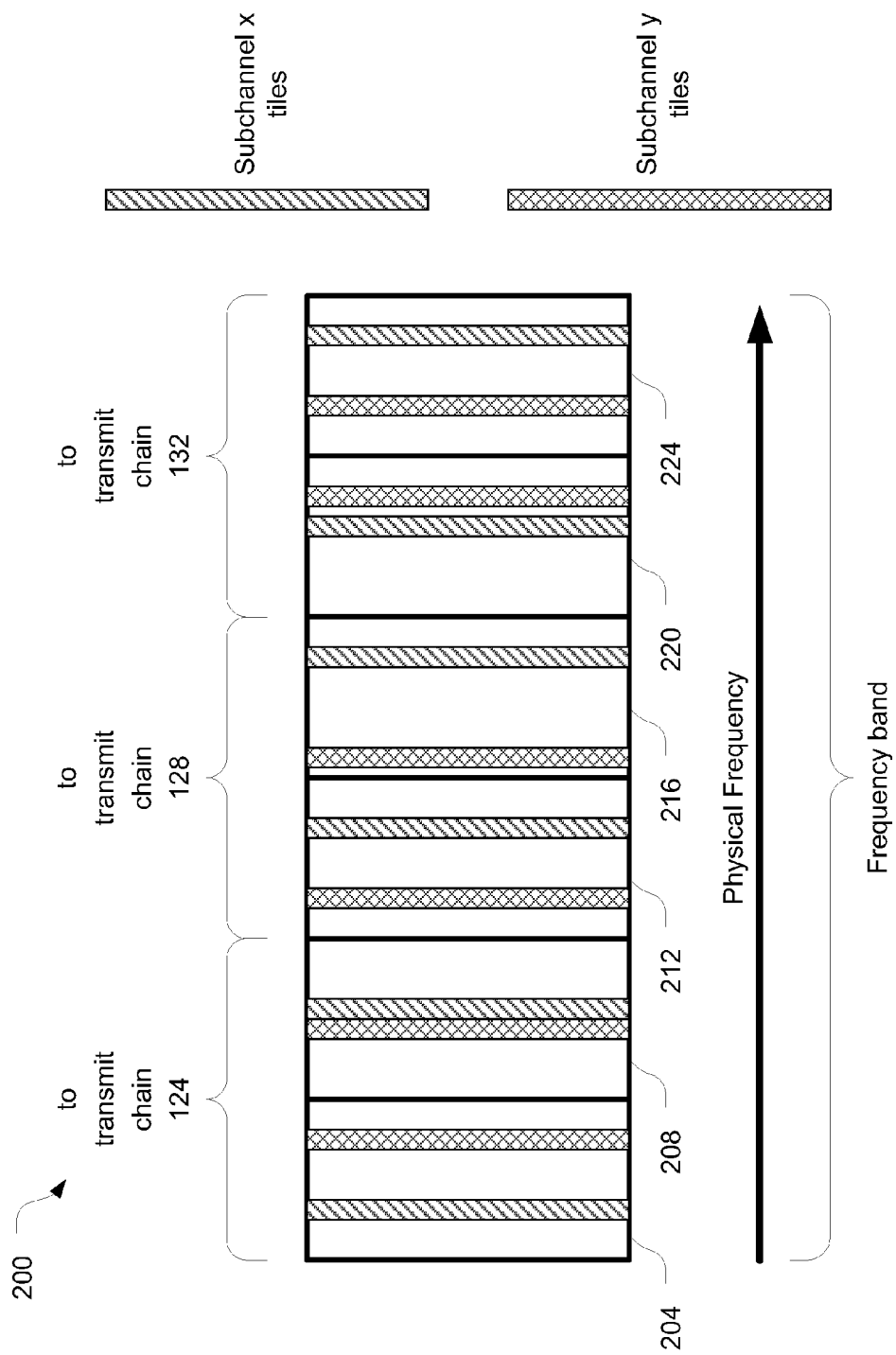
FIG. 2 illustrates a physical resource mapping in accordance with some embodiments.

FIG. 2 illustrates a physical resource mapping 200 that may be used in an UL-PUSC transmission in accordance with various embodiments. The mapping 200 may include tiles that belong to two different subchannels, e.g., subchannel x and subchannel y. Each of the subchannels may include six tiles with a tile located in each of six equal frequency subpartitions, e.g., subpartitions 204, 208, 212, 216, 220, and 224. Each subpartition may be paired with an adjacent subpartition into a frequency partition that is directly and uniquely mapped to a respective transmit chain. Specifically, tiles within subpartitions 204 and 208 may be mapped to transmit chain 124; tiles within subpartitions 212 and 216 may be mapped to transmit chain 128, and tiles within subpartitions 220 and 224 may be mapped to transmit chain 132.

As can be seen in FIG. 2, the frequency partitions, which may account for the entire spectrum of the frequency band to accommodate the entire wideband transmission generated by the modulator 116, may be adjacent to, and contiguous with, one another.

With each transmit chain only being responsible for transmitting tiles that fall within in a relatively narrow bandwidth, e.g., one-third of the frequency band, the out-of-band emissions may also be narrower. This may allow the transmitters of the respective transmit chains to transmit with more power without exceeding limitations imposed by the regulatory spectral mask.

Simulation results with ideal PAs, e.g., hard clippers or non-linear PAs with ideal pre-distortion, show a gain of 1 dB in transmit power for embodiments of this disclosure. So, while a communication device transmitting a wideband, e.g., full bandwidth, transmission over each transmit chain may be associated with a threshold transmit power of 22.6 dBm, a communication device transmitting a narrowband, e.g., a ⅓ bandwidth, transmission over each transmit chain may be associated with a threshold transmit power of 23.6 dBm. Accordingly, embodiments of the present disclosure may transmit 23 dBm signals using three PAs, in three separate transmit chains, when each PA is capable of transmitting 17.3 dBm at full bandwidth and 18.3 dBm at ⅓ bandwidth by $18.3 + 10 \log_{10}(3) = 23$ dBm.

When using a plurality of transmit chains with each transmit chain transmitting the full bandwidth, as is done in conventional CDD schemes, out-of-band emission from each antenna is summed, at least in power. Accordingly, a gap of $10 \log_{10}(N_{TX})$ dB, where $N_{TX}$ is a number of antennas, may be taken from each transmit chain to stay under the regulatory spectral mask. However, when transmitting only a narrowband transmission over each of the plurality of transmit chains, e.g., as described above with respect to the station 104, the spectral skirt provided by the mask may be asymmetric to the transmission profile 312. This may translate to a sum of the out-of-band emissions being much smaller. Taking this into account, an additional ~1.5 dB in transmit power may be achieved for a three transmit chain embodiment as described herein.

Figure 3:
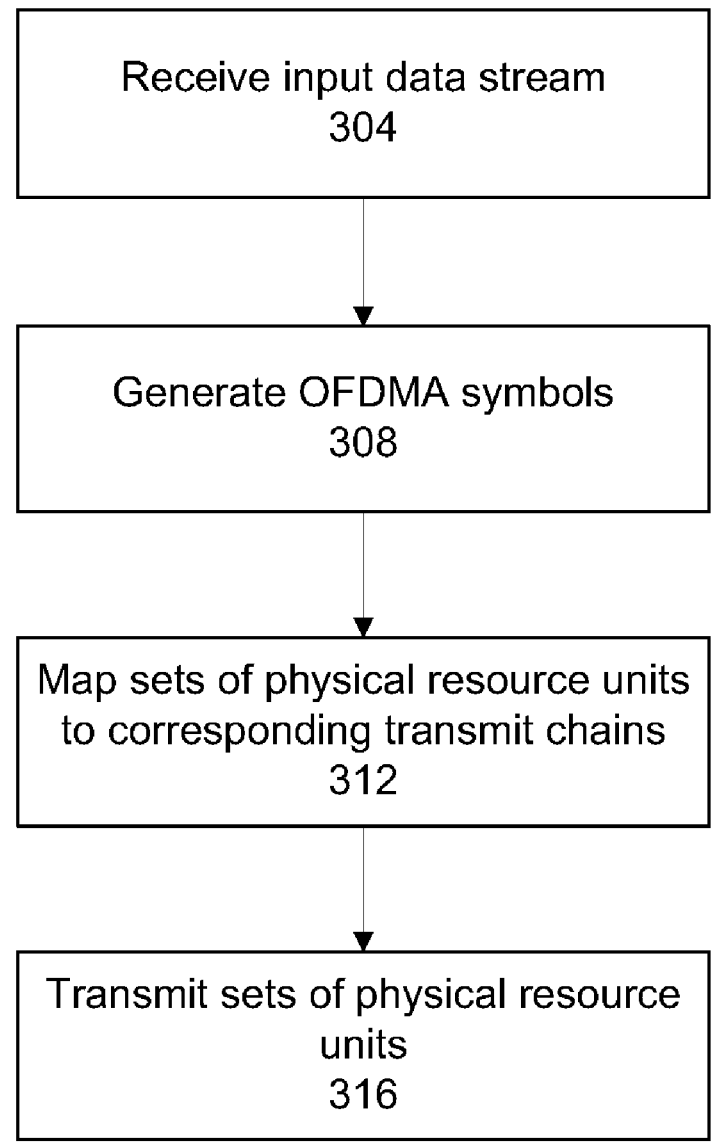
FIG. 3 is a flowchart depicting operations of the station in accordance with some embodiments.

FIG. 3 is a flowchart 300 depicting operations of the station 104 in accordance with some embodiments.

At block 304, the modulator 116 may receive an input data stream from upper levels of the station 104.

At block 308, the modulator 116 may generate a wideband transmission, e.g., one or more OFDMA symbols, based at least in part on the input data stream. The OFDMA symbols may be distributed across a plurality of physical resource units of a frequency band, this distribution may be done by the modulator 116 and/or the mapper 120.

At block 312, the mapper 120 may generate a number of narrowband transmissions by, e.g., mapping sets of physical resource units to corresponding transmit chains. A set of the physical resource units may be defined by frequency partitions, e.g., a range of contiguous frequencies, assigned to a particular transmit chain. In some embodiments, a set may include at least two physical resource units that are adjacent in frequency. Referring to FIG. 2, for example, a set of tiles that may be mapped to transmit chain 124 may be defined by a frequency partition that comprises the bottom third of the frequency band. Any tiles that occur within that frequency partition will, therefore, belong to the set that is mapped to the transmit chain 124. In this embodiment, each set may include two tiles for each subchannel.

At block 316, the transmit chains may transmit corresponding sets of the physical resource units via the OTA link 112.

Figure 4:
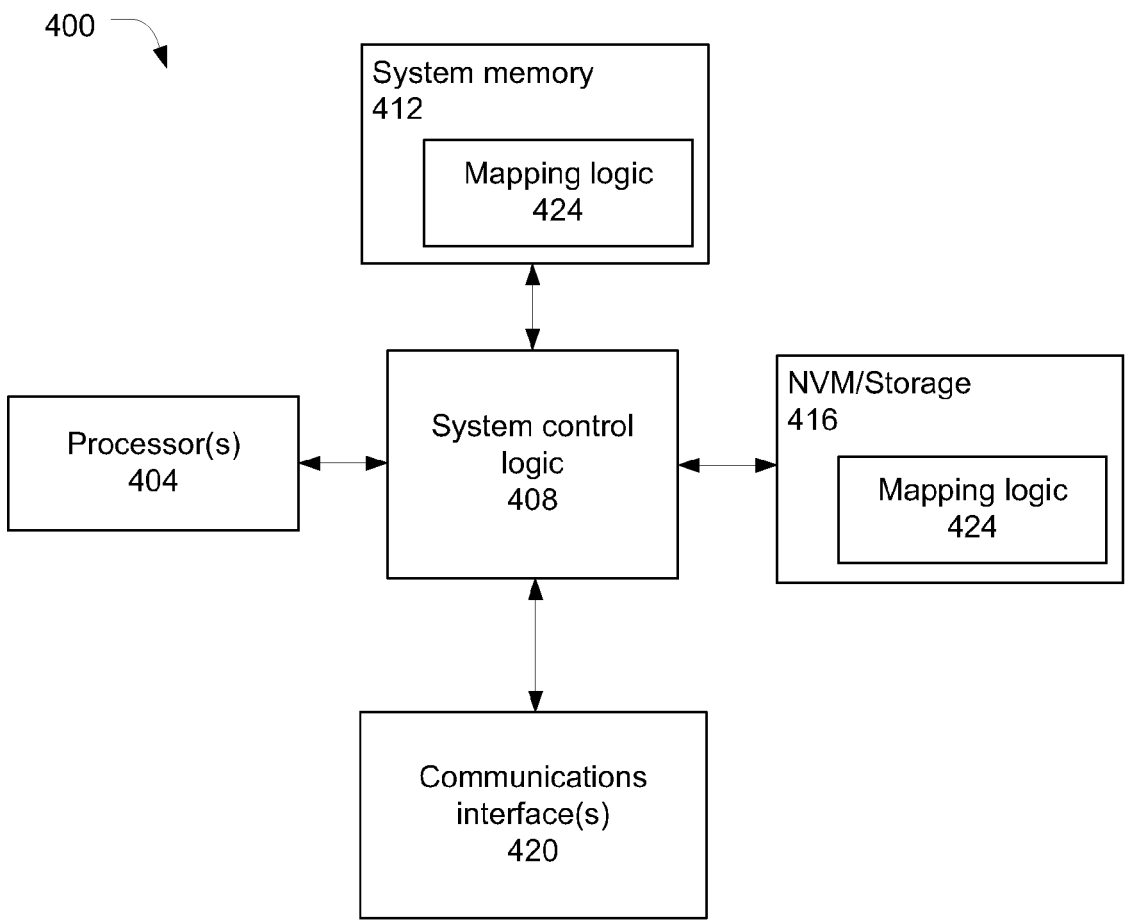
FIG. 4 illustrates a computing device capable of implementing an OFDMA communication system in accordance with some embodiments.

The station 104 may be implemented into a system using any suitable hardware and/or software to configure as desired. FIG. 4 illustrates, for one embodiment, an example system 400 comprising one or more processor(s) 404, system control logic 408 coupled to at least one of the processor(s) 404, system memory 412 coupled to system control logic 408, non-volatile memory (NVM)/storage 416 coupled to system control logic 408, and one or more communications interface(s) 420 coupled to system control logic 408.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

System control logic 408 for one embodiment may include one or more input/output (I/O) controller(s) to provide an interface to NVM/storage 416 and communications interface(s) 420.

NVM/storage 416 may be used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 416 may include a storage resource physically part of a device on which the system 400 is installed or it may be accessible by, but not necessarily a part of, the device. For example, the NVM/storage 416 may be accessed over a network via the communications interface(s) 420.

System memory 412 and NVM/storage 416 may include, in particular, temporal and persistent copies of mapping logic 424, respectively. The mapping logic 424 may include instructions that when executed by at least one of the processor(s) 404 result in the system 400 performing the mapping as described in conjunction with the mapper 120 described herein. In some embodiments, the mapping logic 424 may additionally/alternatively be located in the system control logic 408.

Communications interface(s) 420 may provide an interface for system 400 to communicate over one or more network(s) and/or with any other suitable device. Communications interface(s) 420 may include any suitable hardware and/or firmware. Communications interface(s) 420 for one embodiment may include, for example, a network adapter, a wireless network adapter, a telephone modem, and/or a wireless modem. For wireless communications, communications interface(s) 420 for one embodiment may use one or more antenna(s).

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, system 400 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
receiving an input data stream and generating one or more orthogonal frequency division multiple access (OFDMA) symbols, the one or more OFDMA symbols distributed across a plurality of physical resource units of a frequency band;
mapping a first set of the plurality of physical resource units to a first transmit chain of a wireless communication device, the first set defined by a first frequency partition, having a first range of contiguous frequencies, uniquely assigned to the first transmit chain;
mapping a second set of the plurality of physical resource units to a second transmit chain of the wireless communication device, the second set defined by a second frequency partition, having a second range of contiguous frequencies, uniquely assigned to the second transmit chain; and
transmitting the first and second sets by the first and second transmit chains, respectively, to a receiving device,
wherein each of the first and second transmit chains includes a transmitter and an antenna.

2. The method of claim 1, wherein the first frequency partition is adjacent to, and contiguous with, the second frequency partition.

3. The method of claim 1, wherein the first frequency partition is equal in size to the second frequency partition.

4. The method of claim 1, wherein a plurality of frequency partitions, including the first and second frequency partitions, define a plurality of sets, including the first and second sets, with each of the plurality of frequency partitions uniquely assigned to a respective one of a plurality of transmit chains.

5. The method of claim 4, wherein the frequency band consists of the plurality of frequency partitions.

6. The method of claim 1, wherein said mapping comprises filtering, in each of the first and second transmit chains, out frequencies outside of the respective first and second ranges of frequencies.

7. The method of claim 1, wherein the plurality of physical resource units comprise a plurality of tiles, with each tile including four contiguous subcarriers over three OFDMA symbols.

8. An apparatus comprising:
a modulator configured to receive an input data stream and to generate one or more orthogonal frequency division multiple access (OFDMA) symbols that represent the input data stream;
a mapper coupled to the modulator and configured to distribute a plurality of resource units, which are ordered in frequency over a frequency band and convey the one or more OFDMA symbols, among a plurality of transmit chains, such that each transmit chain receives resource units within a frequency partition of the frequency band that is uniquely assigned to the respective transmit chain; and
the plurality of transmit chains coupled to the mapper and configured to receive the plurality of resource units and to transmit the plurality of resource units to a receiving device via an over-the-air link,
wherein each of the plurality of transmit chains includes a transmitter and an antenna.

9. The apparatus of claim 8, wherein the frequency band is equally divided into the plurality of frequency partitions.

10. The apparatus of claim 8, wherein the plurality of physical resource units comprise a plurality of tiles with each tile including four contiguous subcarriers over three OFDMA symbols.

11. The apparatus of claim 8, wherein the mapper comprises:
a plurality of filters, with each of the plurality filters coupled to a respective one of the plurality of transmit chains and configured to filter out frequencies outside of a frequency partition assigned to the respective transmit chain.

12. An apparatus comprising:
- a modulator configured to receive an input data stream and to generate a wideband transmission, as a plurality of orthogonal frequency division multiple access (OFDMA) symbols, that represents the input data stream;
- a mapper coupled to the modulator and configured to receive the wideband transmission and to generate at least three narrowband transmissions, with each of the at least three narrowband transmissions corresponding to respective one of at least three adjacent and non-overlapping frequency ranges; and
- at least three antennas coupled to the mapper, each of the at least three antennas configured to receive a respective one of the plurality of narrowband transmissions and to transmit the received narrowband transmission to a receiving device via an over-the-air link.

13. The apparatus of claim 12, wherein the mapper comprises:
- a plurality of filters corresponding to the plurality of adjacent and non-overlapping frequency ranges, with each of the plurality of filters configured to filter out frequencies outside of a respective frequency range.

14. The apparatus of claim 12, wherein the plurality of OFDMA symbols are distributed among a plurality of tiles, and each of the plurality of narrowband transmissions includes a respective subset of the plurality of tiles.

15. The apparatus of claim 14, wherein each tile includes four contiguous subcarriers over three OFDMA symbols.

16. The apparatus of claim 12, wherein the at least three antennas are configured to transmit the plurality of OFDMA symbols in an uplink—partially used subcarrier transmission.

17. The apparatus of claim 12, further comprising:
- at least three radio frequency power amplifiers respectively coupled to the at least three antennas.

18. The apparatus of claim 12, wherein the at least three adjacent and non-overlapping frequency ranges are equally sized.

19. The apparatus of claim 17, further comprising:
- at least three inverse fast Fourier transformers (IFFTs) coupled to the mapper and respectively coupled to the at least three radio frequency power amplifiers.

* * * * *